Nov. 2, 1965  R. BERGSMA  3,215,396

HOT WIRE GAS VALVE

Filed July 27, 1962

INVENTOR.
Rudolph Bergsma
BY
Harness, Dickey & Pierce
ATTORNEYS.

United States Patent Office 3,215,396
Patented Nov. 2, 1965

3,215,396
HOT WIRE GAS VALVE
Rudolph Bergsma, Ann Arbor, Mich., assignor to King-Seeley Thermos Co., Ann Arbor, Mich., a corporation of Michigan
Filed July 27, 1962, Ser. No. 212,799
8 Claims. (Cl. 251—11)

This invention relates to gas valves and more particularly to gas valves having a valving element controlled by means of an electrothermal actuator.

Important objects of this invention are to improve gas valves; to improve such valves by controlling a valving element by means of an electrothermal actuator; to obtain such electrothermal actuator control by means including an elongated hot wire, having a relatively high electrical resistance and a high coefficient of thermal expansion which operatively connects to spring means and which is responsive to changes in the electrical energization thereof to control a valving element carried by the spring means.

Certain of the features of the invention are to obtain such electrothermal actuator control by means of such an elongated hot wire and a cantilevered spring arm including a flexible portion which deflects to avoid overstressing the hot wire when the valve is closed; to improve the sealing relationship between such a valve seat and valving element by including a swivel connection between the valving element and the spring arm so that the valving element can tilt to conform to the seating surface on the valve seat; and to further improve the sealing relationship between such a valve seat and such a valving element by including a valve seat insert having a relatively small seating surface which produces a substantial closure force per square inch at the face of the valving element.

The manner of accomplishing the foregoing objects, and other objects and features of the invention, will become apparent from the following detailed description of an embodiment of the invention when read with reference to the accompanying drawings in which.

Figure 1:
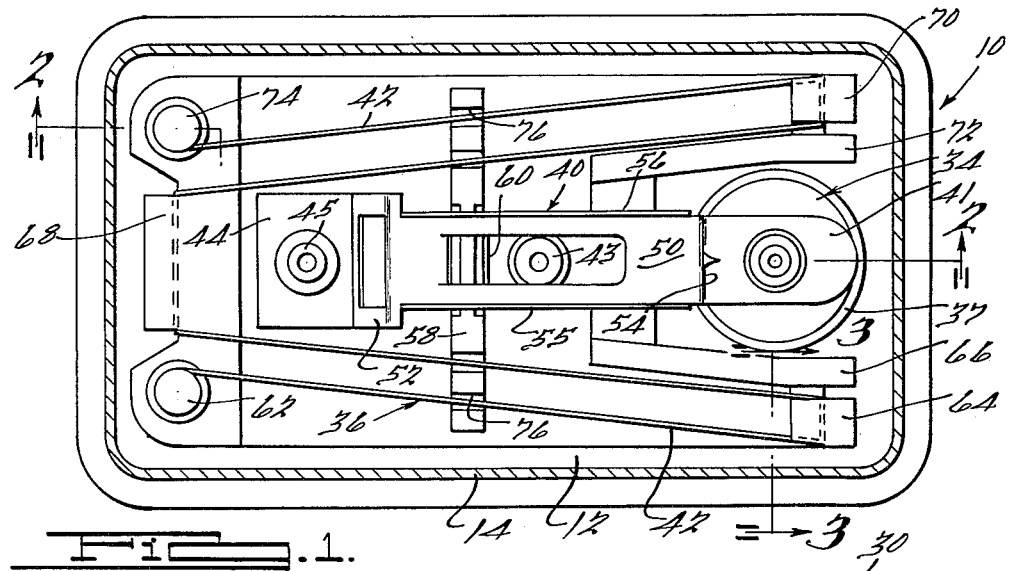
FIGURE 1 is a top plan view of a hot wire gas valve which embodies the principles of the present invention with its top cover broken away.
Figure 2:
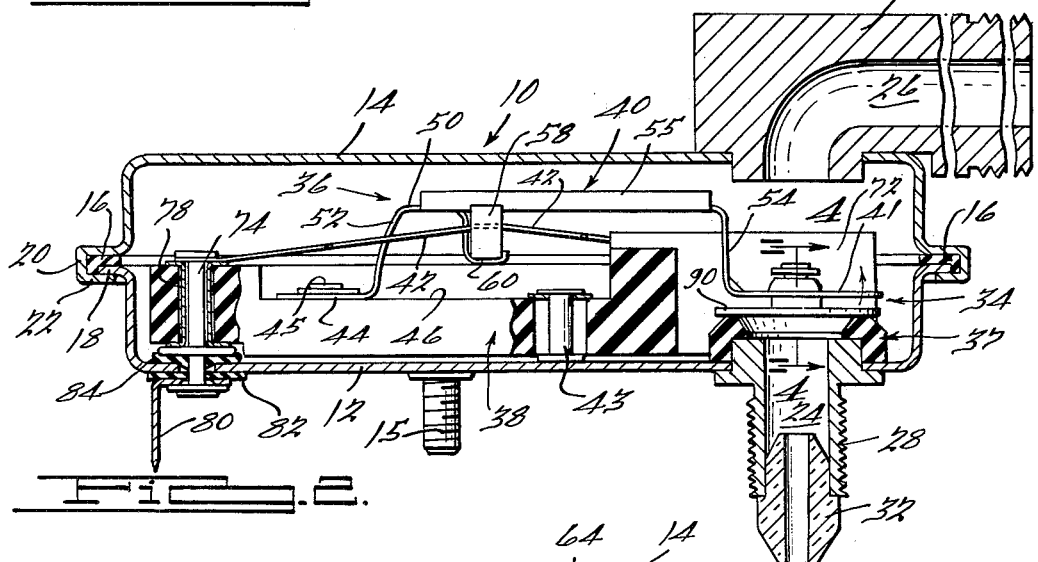
FIGURE 2 is a view in vertical section taken substantially along the line 2—2 of FIGURE 1.
Figure 3:
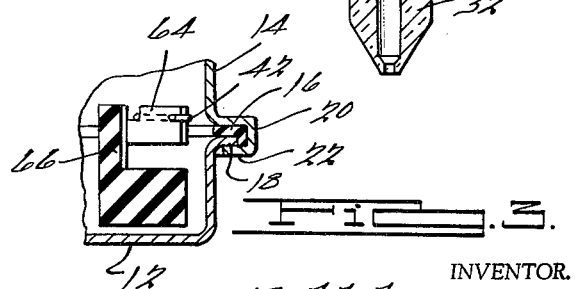
FIGURE 3 is a view in vertical section taken along the line 3—3 of FIGURE 1.
Figure 4:
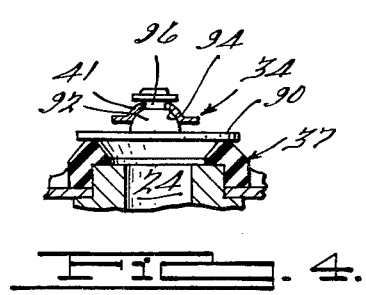
FIGURE 4 is a view in vertical section taken along the line 4—4 of FIGURE 2.

Referring now to the drawing, one embodiment of the hot wire gas valve of the present invention is illustrated as generally comprising a housing 10 including a lower dished portion 12 and an upper dished portion 14. The dished portion 12 has a threaded stud 15 directed outwardly therefrom which is adapted to be engaged by suitable mounting means.

The interface between the dished portions 12 and 14 is sealed against gas leaks by a gasket 16 with an L-shaped cross section which is supported by an outwardly directed flange 18 on the upper edge of the lower dished portion 12. The legs of the gasket 16 are clamped in a gas-tight sealing relationship between the inner surface of an outwardly and downwardly directed shoulder 20 on the upper dished portion 14 and the outwardly directed flange 18 by means of an inwardly directed lower edge 22 on the dished portion 14 which engages the underside of the flange 18.

The valve further includes first and second ports including a gas outlet port 24 and a gas inlet port 26 defined by tubular elements 28, 30 respectively, which are connected to the dished portions 12, 14, respectively. An orifice element 32 is preferably inserted into the outwardly directed end of the tubular element 28 for metering gas flow out of the housing 10. The outlet port 24 is opened and closed by a valving element 34 which is moved by an electrothermal actuator 36 into and out of engagement with a valve seat 37 of flexible material such as rubber which surrounds the outlet port 24.

The electrothermal actuator 36 generally comprises a support base portion 38 of electrical insulating material, a cantilevered spring arm 40 which has a freely movable end 41 supporting the valving element 34, and an elongated wire 42 of appropriate electrical thermal characteristics including a finite resistance with a substantial coefficient of thermal expansion but of a limited diameter and tensile strength. The base 38 is fixed with respect to the outlet port 24 by means including a stud 43 having one end connected to the dished portion 12 and its opposite end located inwardly of the base 38 where its head is swaged against washer means which bear against the base 38.

The cantilevered spring arm 40 is representatively illustrated as having one end 44 anchored by means of suitable fastening means 45 on a recessed surface 46 of the base 38 and is further illustrated as having its opposite freely movable end 41 and an elongated rigidized central portion 50 spring-baised to move the valving element 34 away from the valve seat 37. The central portion 50 is located in spaced parallelism with the recessed surface 46 by flexible offset leg spring portions 52, 54 which connect the opposite ends of the central portion 50 to the anchored end 44 and the freely movable end 41 of the spring arm, respectively. The central portion 50 has a pair of laterally spaced flanges 55, 56 on either side thereof which stiffen this portion of the spring arm 40 against deflection for reasons to be discussed. Movement of the spring arm 40 away from the valve seat 37 is restrained by the hot wire 42 which bears against a transverse rod or arm 58 which is supported on one face of the central portion 50 by means of a clip 60 which is directed outwardly of the central portion 50.

More particularly, in the illustrated embodiment, the elongated hot wire 42 is illustrated as a single long wire which is wound to define a plurality of reaches, representatively, four, which extend substantially parallel to the recessed surface 46 of the base 38. In this arrangement, the wire 42 starts at one end of a first post 62 which has its opposite end fastened to the dished portion 12. It then is passed around an ear portion 64 directed laterally outwardly of a first forward wall portion 66 of the base 38, around a tab 68 defined by the opposite end of the base 38, around a second ear 70 which is directed laterally outwardly of a second forward wall portion 72 of the base 38 which is laterally spaced from the first wall 66 and back to one end of a second post 74 which has its opposite end fastened to the dished portion 12 at a point laterally spaced from the first post 62.

A portion of each of the reaches of the hot wire 42 between the laterally spaced ears 64, 70 at one end of the base 38 and the laterally spaced posts 62, 74 and tab 68 on the opposite end of the base 38 engages the transverse arm 58 at laterally spaced grooves 76 defined in one surface thereof to produce the above described restraining action. The wire 42 may be anchored at each of the posts 62, 74 and ears 64, 70 by means of a suitable adhesive so that the wire 42 will not unravel if one of the reaches snaps. Accordingly, the valve will fail safe since the remaining unbroken reaches will be deenergized and thereby will contract to restrain the spring arm 40 from moving the valving element 34 away from the valve seat 37.

A further advantage of the wound hot wire 42 arrangement is that the force required to hold the valve 34 in gas-tight sealing engagement with the valve seat 37 is distributed to the plural reaches rather than being imposed on a single elongated wire. Accordingly, a desired sealing force can be maintained without sacrificing appropriate electrothermal characteristics in the hot wire 42.

The electrothermal actuator 36 is energized by means of a suitable input circuit which is electrically connected to the hot wire 42 by means of a pair of tubular conductor elements 78 one of which surrounds and contacts each of the anchor posts 62, 74, and a pair of terminal elements 80 one of which is securely stacked to each of the anchor posts 62, 74. A plurality of washers 82, 84 of suitable electrical insulating material insulate the dished portion 12 from current flow through the terminals 80, posts 62, 74 and tubular conductor elements 78.

In the drawing, the valve is representatively shown in a normally closed position in which the wire 42 is deenergized and contracted between the anchor posts 62, 74, the tab 68 on one end of base 38 and the ears 64, 70 on the opposite end of the base 38 to bear downwardly against the transverse arm 58 so as to force the valving element 34 on the freely movable end 41 of the valve 40 toward the valve seat 37. The valving element 34 includes a flat disc-like valve surface 90 which is swively connected to the freely movable end 41 by means of a hemispherically-shaped ball 92 on the top surface of the valve surface 90 which is received by a socket 94 in the freely movable end 41. The ball 92 and socket 94 are held in engagement by swaging the end portion of an arm 96 which extends outwardly of the ball 94 over and into engagement with the freely movable end 41.

When the valve surface 34 travels to one point wherein the valve surface 90 engages the valve seat 37, a relatively large closure force per square inch occurs at the valve face due to the fact that the area of the seating surface of the seat 37 is relatively small. Furthermore, the electrothermal actuator 36, in accordance with certain other of the concepts of the present invention, has sufficient flexibility in the various elements thereof to allow the wire 42 to continue to contract without being overstressed after the valve is closed. In the illustrated embodiment, such flexibility is produced by means of the offset leg 52 of the cantilever spring arm 40, clip 60, and the resilient rubber seat 37. The leg 52 and clip 60 deflects when the wire 42 forces the valve closed to cause the valving surface 90 to shift across the top surface of the valve seat 37. This shifting action, plus the resiliency of the seat 37, prevents its acting as a dead stop which might otherwise overstress the individual reaches of the wire 42 as they are contracting between the anchored ends thereof.

The swivel connection between the valving element 34 and the freely movable end 41 of the cantilevered spring arm 40 allows the valve surface 90 to tilt to conform to the seating surface on the valve seat 37 as it shifts relative thereto to assure a gas-sealing relationship therebetween. Once the valve is closed, the differential in gas pressure across the valving element 34 supplements the closing force produced by the wire 42 to further assure such a gas-sealing relationship between the valve surface 90 and the valve seat 37.

When the input circuit energizes the wire 42, the wire will self-heat and thereby elongate between the anchored ends thereof to allow the spring arm 40 to move in a direction and to a position to open the valve to gas flow from the inlet port 26 and out of the outlet port 24. In the illustrated embodiment, this opening action occurs without any appreciable time lag since the slightest elongation of the wire 42 will allow the spring arm 40 to swing the valving element 34 in an arc to tilt the valve surface 90 about its swivel connection to separate a portion of the surface 90 from the seat 37 sufficiently to substantially eliminate the differential gas pressure across the valve. Once the supplemental closing force produced by the differential pressure is removed the valve element 34 opens sufficiently to permit substantially unrestricted gas flow thereacross. Also, when wire 42 is deenergized it will rapidly contract and thereby apply a closing force against the rigidized central portion 50 of the spring arm 40 to produce an immediate closing movement of the valving element 34.

It should also be understood that the input circuit may modulate current flow through wire 42 so that the valving element 34 will assume an infinite number of positions between its fully opened and closed positions depending on the degree to which the wire 42 elongates by self-heating. In such cases, the valving element may be modified in a conventional manner to meter gas flow through the valve as a function of the current flow through the wire 42.

It will be understood that the specific construction of the wire valve which is herein disclosed and described is presented for purposes of explanation and illustration, and is not intended to indicate limits of the invention, the scope of which is defined by the following claims.

What is claimed is:

1. An electrothermally actuated fluid valve associable with a source of electrical energy for controlling fluid flow comprising a housing having a support base portion therein, means defining first and second ports in said housing, a valving element in said housing engageable with one of said ports for controlling the flow of fluid between said ports, means including a cantilever spring means supported by said base having an elongated rigidized central portion and a spring portion adjacent one of said ports for supporting said valving element and exerting a force tending to move said valving element in a first direction relative to one of said ports, anchor means spaced on said support base portion, a wire having a high coefficient of thermal expansion adapted to elongate and contract in response to changes in electrical energization thereof, a length of said wire passing between said anchor means and in tension therebetween, said length being in substantial parallelism with one face of said support base portion, said wire producing forces perpendicular to said base by said elongation and contraction, and means including said cantilever spring means for transmitting said forces at an intermediate part of said length to said valving element in a direction opposite to said first direction to vary the flow of fluid between said ports, said wire being in an increased stressed condition at one point of its travel in said opposite direction when said valve engages said port and said flexible portion being deflected in the direction opposite to said force exerting direction beyond said point of travel in said opposite direction as said wire continues to contract for preventing overstressing of said wire.

2. An electrothermally actuated fluid valve associable with a source of electrical energy for controlling fluid flow comprising a housing having a base portion thereon, means defining a first and a second port in said housing, a valving element, means defining a valve seat surrounding one of said first and second ports, a cantilevered spring arm having one end supported by said base and a freely movable end adjacent one of said ports for supporting and actuating said valving element, said spring arm exerting a force tending to move said valving element in a first direction relative to said valve seat, anchor means spaced on said support base, a wire having a high coefficient of thermal expansion adapted to elongate and contract in response to changes in electrical energization thereof, a length of said wire passing between said anchor means in substantial parallelism with one face of said support base and supported in tension between said anchor means, said spring arm having a rigidized central portion in spaced, substantial parallelism with said one face of said support base, and a rigid arm supported by said rigidized central portion engaging said wire length at a median portion thereof for transmitting said elongations and contractions to said cantilevered spring arm and forcing said cantilevered spring arm in a direction opposite to said first direction to control the flow of fluid through said first and second ports, said spring arm further including a flexible portion offset from said rigidized central portion which deflects when said valving element engages said valve seat for causing said valving element to shift laterally across said valve seat, said wire being in an increased stressed condition at one point of its travel in said opposite direction when said valve engages said port and said flexible portion being deflected in the direction opposite to said force exerting direction beyond said point of travel in said opposite direction as said wire continues to contract for preventing an overstressing of said wire.

3. An electrothermally actuated fluid valve associable with a source of electrical energy for controlling fluid flow comprising:
 a housing having a support base portion therein,
 means defining first and second ports for conducting fluid in said housing,
 a valving element in said housing engageable with one of said ports for controlling fluid flow between said ports,
 means defining a valve seat surrounding one of said ports and adapted to engage said valving element at a small area thereof,
 support means including resilient means supported at one end thereof by said base portion and having a freely movable end supporting said valving element, said resilient means having a central rigid portion and a flexible portion formed of flexible material as compared to said rigid portion,
 said resilient means exerting a force tending to move said valve element in a first direction relative to said one of said ports,
 at least one length of wire supported in said housing in tension and in substantial parallelism with said base portion,
 said wire having a high coefficient of thermal expansion and adapted to elongate and contract in response to changes in electrical energization thereof from the source of electrical energy, and
 means for mechanically coupling said support means and said length of wire at a median portion thereof for transmitting said elongation and contraction to said spring means thereby opposing said exerted force and actuating said valving element in a direction opposite to said first direction, said wire being in an increased stressed condition at one point of its travel in said opposite direction when said valve engages said port and said flexible portion being deflected in the direction opposite to said force exerting direction beyond said point of travel in said opposite direction as said wire continues to contract for preventing overstressing of said wire.

4. An electrothermally actuated fluid valve associable with a source of electrical energy for controlling fluid flow comprising:
 a housing having a support base portion therein,
 means defining first and second ports for conducting fluid in said housing,
 a valving element in said housing engageable with one of said ports for controlling fluid flow between said ports,
 means defining a valve seat surrounding one of said ports and adapted to engage said valving element at a small area thereof,
 support means including resilient means supported at one end thereof by said base portion and having a freely movable end supporting said valving element,
 said resilient means exerting a force tending to move said valve element in a first direction relative to said one of said ports,
 at least one length of wire supported in said housing in tension and in substantial parallelism with said base portion,
 said wire having a high coefficient of thermal expansion and adapted to elongate and contract in response to changes in electrical energization thereof from the source of electrical energy,
 said spring means further including a central rigidized portion in spaced relation to said support base portion and a flexible portion offset from said rigidized central portion which deflects when said valving element engages said valve seat, and
 means for mechanically coupling said spring means at said rigidized portion and said length of wire at a median portion thereof for transmitting said elongation and contraction to said spring means thereby opposing said exerted force and actuating said valving element in a direction opposite to said first direction, said wire being in an increased stressed condition at one point of its travel in said opposite direction when said valve engages said port and said flexible portion being deflected in the direction opposite to said force exerting direction beyond said point of travel in said opposite direction as said wire continues to contract for preventing overstressing of said wire.

5. An electrothermally actuated fluid valve associable with a source of electrical energy for controlling fluid flow comprising; a housing having first and second ports, a valving element in said housing engageable with one of said ports for controlling the flow of fluid between said ports, support means including means having a portion adjacent one of said ports for supporting said valving element and exerting a force tending to move said valving element in a first direction relative to one of said ports, said support means having a central rigid portion and a flexible portion formed of flexible material as compared to said rigid portion, a wire having a high coefficient of thermal expansion adapted to elongate and contract in response to changes in electrical energization thereof, means supporting a portion of said wire in tension in said housing, and means for transmitting forces produced by said elongation and contraction from an intermediate part of said wire portion to said support means in a direction opposite to said first direction to vary the flow of fluid between said ports, said wire being in an increased stressed condition at one point of its travel in said opposite direction when said valve engages said port and said flexible portion being deflected in the direction opposite to said force exerting direction beyond said point of travel in said opposite direction as said wire continues to contract for preventing overstressing of said wire.

6. An electrothermally actuated fluid valve associable with a source of electrical energy for controlling fluid flow comprising; a housing having first and second ports, a valving element in said housing engageable with one of said ports for controlling the flow of fluid between said ports, support means including a cantilevered spring arm having a freely movable end adjacent one of said ports for supporting said valving element and exerting a force tending to move said valving element in a first direction relative to one of said ports, said support means having a central rigid portion and a flexible portion formed of flexible material as compared to said rigid portion, a wire having a high coefficient of thermal expansion adapted to elongate and contract in response to changes in electrical energization thereof, means supporting a portion of said wire in tension in said housing, and means for transmitting forces produced by said elongation and contraction from an intermediate part of said wire portion to said cantilevered spring arm to move said valving element in a direction opposite to said first direction to vary the flow of fluid between said ports, said wire being in an increased stressed condition at one point of its travel in said opposite direction when said valve engages said port and said flexible portion being deflected in the direction opposite to said force exerting direction beyond said point of travel in said opposite direction as said wire continues to contract for preventing overstressing of said wire.

7. An electrothermally actuated fluid valve associable with a source of electrical energy for controlling fluid flow comprising; a housing having first and second ports, a valving element in said housing engageable with one of said ports for controlling the flow of fluid between said ports, means defining a valve seat surrounding one of said ports, support means including a cantilevered spring arm having a freely movable end adjacent said valve seat for supporting said valving element and exerting a force tending to move said valving element in a first direction relative to said valve seat, said support means having a central rigid portion and a flexible portion formed of flexible material as compared to said rigid portion, a wire having a high coefficient of thermal expansion adapted to elongate and contract in response to changes in electrical energization thereof, means supporting a portion of said wire in tension in said housing and means for transmitting forces produced by said elongation and contraction from an intermediate part of said wire portion to said cantilevered spring arm to move said valving element in a direction opposite to said first direction to vary the flow of fluid between said ports, said wire being in an increased stressed condition at one point of its travel in said opposite direction when said valve engages said port and said flexible portion being deflected in the direction opposite to said force exerting direction beyond said point of travel in said opposite direction as said wire continues to contract for preventing overstressing of said wire.

8. An electrothermally actuated fluid valve associable with a source of electrical energy for controlling fluid flow comprising; a housing having a support base portion, first and second ports for conducting fluid in said housing, a valving element in said housing engageable with one of said ports for controlling the flow of fluid between said ports, means defining a valve seat surrounding one of said ports, a cantilever spring arm having a central rigidized portion and a portion adjacent said valve seat for supporting said valving element, said spring arm having a flexible portion formed of flexible material as compared to said rigidized portion and exerting a force tending to move said valving element in a first direction relative to said valve seat, a wire having a high coefficient of thermal expansion supported in tension by and substantially parallel to said base portion, said wire adapted to elongate and contract in response to changes in electrical energization thereof, means for mechanically coupling said wire at a median portion thereof to said valving element for moving said valving element in a direction opposite to said first direction to vary the flow of fluid between said ports, and means interconnecting said valving element and said resilient means for swiveling and tilting movement therebeween to allow said valving element to adjustably conform to the seating surface of said valve seat when in engagement therewith, said inlet and outlet ports being arranged in said housing to produce a differential pressure across said valving element which tends to hold it in engagement with said valve seat, said cantilevered spring arm adapted to move said valving element in an arc and tilt said valving element relative to said valve seat for eliminating said differential pressure across said valving element in response to a change in the electrical energization of said wire, said wire being in an increased stressed condition at one point of its travel in said opposite direction when said valve engages said port and said flexible portion being deflected in the direction opposite to said force exerting direction beyond said point of travel in said opposite direction as said wire continues to contract for preventing overstressing of said wire.

References Cited by the Examiner
UNITED STATES PATENTS

| | | | |
|---|---|---|---|
| 261,021 | 7/82 | Miller | 251—303 |
| 894,897 | 8/08 | Osborne | 251—303 X |
| 921,625 | 5/09 | Phelps | 236—68 |
| 2,030,932 | 2/36 | Persons | 251—11 X |
| 2,240,436 | 4/41 | Borresen | 236—68 |
| 2,399,020 | 4/46 | Hall | 251—11 |
| 3,097,279 | 7/63 | Whinery | 200—113.1 |

M. CARY NELSON, *Primary Examiner.*

LAVERNE D. GEIGER, *Examiner.*